United States Patent [19]

Kaplinsky

[11] Patent Number: 4,462,052
[45] Date of Patent: Jul. 24, 1984

[54] DEVICE FOR INTERROGATING AND CORRECTING A SERIAL DATA SIGNAL

[75] Inventor: Cecil H. Kaplinsky, Sunnyvale, Calif.

[73] Assignee: U.S. Philips Corporation, New York, N.Y.

[21] Appl. No.: 365,713

[22] Filed: Apr. 5, 1982

[30] Foreign Application Priority Data

Apr. 14, 1981 [NL] Netherlands ............... 8101825

[51] Int. Cl.³ .................................... G11B 5/09
[52] U.S. Cl. ................................ 360/53; 360/39
[58] Field of Search ................ 360/39, 53; 371/38.1

[56] References Cited
U.S. PATENT DOCUMENTS 4,394,762 7/1983 Nabeshima .................. 360/53

Primary Examiner—Vincent P. Canney
Attorney, Agent, or Firm—Thomas A. Briody; William J. Streeter; Edward W. Goodman

[57] ABSTRACT

A device for the interrogation and correction of a data signal which adopts a finite number of discrete signal values in a consecutive series of data cells. The transitions between the signal values exhibit a nominal minimum spacing. The signal is periodically interrogated with a period which amounts to, at the most, half of said minimum spacing. If a finite series of successive interrogation values exhibits a permissible pattern, the data value is directly derived therefrom (36). There is a set of further patterns which are not permissible, but which do not deviate excessively from a permissible pattern; the associated data value of the corresponding permissible pattern is then simulated. In the other cases an error signal (34) is formed. The pattern has a length which exceeds the length of a data cell. The inherent redundancy of the data signal is thus partly used for the correction of errors.

4 Claims, 6 Drawing Figures

| | | | | | | | | | | | | | | | |
|---|---|---|---|---|---|---|---|---|---|---|---|---|---|---|---|
| 0 | 0 | 0 | 0 | 0 | 0 | 0 | 3 | | 32 | 1 | 0 | 0 | 0 | 0 | 4 |
| 1 | 0 | 0 | 0 | 0 | 0 | 1 | 0 | | 33 | 1 ✻ | 0 | 0 | ✻ | 1 | 0 |
| 2 | 0 | 0 | 0 | 0 | 1 ✻ | 0 | | 34 | 1 | 0 | 0 | 0 | 1 ✻ | 0 |
| 3 | 0 | 0 | 0 | 0 | 1 | 1 | 0 | | 35 | 1 | 0 | 0 | 0 | 1 | 1 | 0 |
| 4 | 0 | 0 | 0 | 1 ✻ | 0 | 1 | | 36 | 1 | 0 | 0 | 1 | 0 | 0 | 4 |
| 5 | 0 | 0 | 0 | 1 ✻ | 1 | 1 | | 37 | 1 | 0 | 0 | 1 ✻ | 1 | 1 |
| 6 | 0 | 0 | 0 | 1 | 1 | 0 | 1 | | 38 | ✻ | 0 | 0 | 1 | 1 ✻ | 1 |
| 7 | 0 | 0 | 0 | 1 | 1 | 1 | 1 | | 39 | 1 | 0 | 0 | 1 | 1 | 1 | 1 |
| 8 | 0 ✻ | 1 ✻ | 0 | 0 | 0 (2) | | 40 | 1 ✻ | 1 | 0 | 0 | 0 | 2 |
| 9 | 0 | 0 | 1 | 0 | 0 | 1 | 3 | | 41 | 1 ✻ | 1 | 0 | 0 | 1 | 2 |
| 10 | 0 | 0 | 1 ✻ | 1 | 0 | 0 | | 42 | 1 | 0 | 1 | 0 | 1 | 0 | 4 |
| 11 | 0 | 0 ✻ | 0 | 1 | 1 | 0 | | 43 | 1 | 0 ✻ | 0 | 1 | 1 | 0 |
| 12 | 0 | 0 | 1 | 1 | 0 | 0 | 0 | | 44 | ✻ ✻ | 1 | 1 | 0 | 0 | 0 |
| 13 | 0 | 0 | 1 | 1 | 0 ✻ | 0 | | 45 | 1 | 0 | 1 | 1 | 0 | 1 | 3 |
| 14 | 0 | 0 | 1 | 1 | 1 | 0 | 0 | | 46 | ✻ ✻ | 1 | 1 | 1 | 0 | 0 |
| 15 | 0 | 0 ✻ | 1 | 1 ✻ | 0 (1) | | 47 | 1 | 0 ✻ | 1 | 1 | 1 | 1 |
| 16 | 0 | 1 ✻ | 0 | 0 | 0 | 2 | | 48 | 1 | 1 ✻ | 0 | 0 ✻ | 0 (2) |
| 17 | ✻ ✻ | 0 | 0 | 0 | 1 | 0 | | 49 | 1 | 1 | 0 | 0 | 0 | 1 | 0 |
| 18 | 0 | 1 | 0 | 0 | 1 | 0 | 3 | | 50 | 1 | 1 | 0 | 0 | 1 ✻ | 0 |
| 19 | ✻ ✻ | 0 | 0 | 1 | 1 | 0 | | 51 | 1 | 1 | 0 | 0 | 1 | 1 | 0 |
| 20 | 0 | 1 ✻ | 1 | 0 | 0 | 0 | | 52 | 1 | 1 ✻ | 1 | 0 | 0 | 0 |
| 21 | 0 | 1 | 0 | 1 | 0 | 1 | 4 | | 53 | 1 | 1 | 0 ✻ | 0 | 1 | 0 |
| 22 | 0 ✻ | 0 | 1 | 1 | 0 | 1 | | 54 | 1 | 1 | 0 | 1 | 1 | 0 | 3 |
| 23 | 0 ✻ | 0 | 1 | 1 | 1 | 1 | | 55 | 1 ✻ | 0 ✻ | 1 | 1 | 0 (1) |
| 24 | 0 | 1 | 1 | 0 | 0 | 0 | 2 | | 56 | 1 | 1 | 1 | 0 | 0 | 0 | 2 |
| 25 | ✻ | 1 | 1 | 0 | 0 ✻ | 2 | | 57 | 1 | 1 | 1 | 0 | 0 | 1 | 2 |
| 26 | 0 | 1 | 1 | 0 ✻ | 0 | 2 | | 58 | 1 | 1 | 1 | 0 ✻ | 0 | 2 |
| 27 | 0 | 1 | 1 | 0 | 1 | 1 | 4 | | 59 | 1 | 1 | 1 | 0 ✻ | 1 | 2 |
| 28 | 0 | 1 | 1 | 1 | 0 | 0 | 0 | | 60 | 1 | 1 | 1 | 1 | 0 | 0 | 0 |
| 29 | 0 | 1 | 1 | 1 | 0 ✻ | 0 | | 61 | 1 | 1 | 1 | 1 | 0 ✻ | 0 |
| 30 | 0 ✻ | 1 | 1 ✻ | 0 | 0 | | 62 | 1 | 1 | 1 | 1 | 1 | 0 | 0 |
| 31 | 0 | 1 | 1 | 1 | 1 | 1 | 4 | | 63 | 1 | 1 | 1 | 1 | 1 | 1 | 3 |

DEVICE FOR INTERROGATING AND CORRECTING A SERIAL DATA SIGNAL

BACKGROUND OF THE INVENTION

The invention relates to a device for interrogating and correcting a serial data signal. A data signal has the property that nominally the signal has one of a finite set of values at any instant. The complete set may comprise, for example, 2, 3 or 4 elements. In reality other signal values can also occur due to disturbances or finite edge steepnesses. During interrogation, discrimination also takes place and each interrogation value is translated into an element of said set. Thus, a series of interrogation data is formed, for example, interrogation bits. Said disturbances and finite edge steepnesses can cause incorrect elements to occur in the series of interrogation data. In some cases these incorrect elements can be corrected. For example, additional data may be added to the data signal, for example by the inclusion of additional data cells, so that an error correcting code is obtained. The addition of such additional data cells reduces the efficiency of the channel, which is measured as the quantity of data per unit of time (without taking into account said additional data). A data cell is to be understood to mean herein the smallest logic unit of a data signal, that is to say the smallest time interval from which the data can be recovered in principle without it being necessary to know the data in one or more preceding or subsequent data cells. In the case of bivalent data, a data cell contains at least one data bit. In the biphase code to be described hereinafter, a data cell is identical to the bit cell.

Additional data can be added to the signal for other purposes, for example for making the signal self-clocking. U.S. Pat. No. 3,893,171 describes a device for interrogating and correcting a data signal which is composed in accordance with the MFM (modified frequency modulation) method. This signal has two nominal values and embodies a series of data bits. The signal is interrogated twice per bit cell and each interrogation produces an interrogation bit. The series of nominal interrogation bits consists of series of successively one, two or three "zeroes", each time separated by a single "one". According to said Patent Specification, use is made of the fact that the MFM method introduces a given redundancy. It is thus possible to indicate a single combination of interrogation bits, i.e. two directly successive "1" signals, as being incorrect. If these two "1" signals are flanked with mutually unequal series of "zeroes", unambiguous correction is possible. The inventor of the present invention has found that the possibility of error correction can be enhanced: for a single code, several kinds of error can be corrected and, moreover, the method can be used for different codes.

SUMMARY OF THE INVENTION

It is an object of the invention to enable a larger variety of errors in the interrogation values to be corrected in order to obtain a sequence of correct interrogation values. The redundancy incorporated in the modulation of the code words is thus used to enable errors in the interrogation values to be corrected. The object in accordance with the invention is realized in that the device for interrogating and correcting a data signal, which consists of a non-interrupted series of data cells and therein a continuous signal having a finite number of discrete nominal signal values and transitions between said signal values, said transitions mutually having a nominal minimum spacing and a nominal maximum spacing, comprises:

a. a synchronization device for deriving and updating an actual synchronization period from said transitions;

b. an interrogation generator for forming, under the control of a signal sequence having said synchronization period, a series of substantially equally spaced interrogation signals having a nominal recurrence period which amounts to, at the most, half the value of said minimum spacing;

c. a storage device for receiving and storing, under the control of said series of interrogation signals, a succession of interrogation values each discriminated to one of said finite number of nominal signal values;

d. an updating device which is connected to said storage device for receiving, each time in synchronism with an interrogation signal, a current selection of, each time, at least five successive interrogation values of said succession, said successive interrogation values comprising at least one interrogation value beyond the number which corresponds to the length of a data cell, for generating, always under the control of one of a first predetermined number >1 of permissible combinations of said successive interrogation values, a correspondence signal for the relevant combination, for generating, under the control of one of a second predetermined number >1 of impermissible combinations of said successive interrogation values, a simulation signal for simulating, each time for an impermissible combination, a corresponding permissible combination which differs therefrom by one interrogation value and which forms part of a third predetermined number >1 of permissible combinations of successive interrogation values, and for generating an exceed signal under the control of further impermissible combinations of said successive interrogation values;

e. a decoder for receiving said corresponding or simulated interrogation values and for reconstructing a series of digital data therefrom;

f. a final output which is connected to the decoder for supplying the decoded series of data to a user device. Contrary thereto, the known device utilizes only a single interrogation signal between two successive signal transitions which are situated the nominal minimal spacing apart, and only two interrogation signals per data cell (the value 01 produces a data bit of a first logic value; the interrogation values 00 and 10 produce a data bit of the second logic value; the interrogation values 11 indicate an error). Furthermore, the known device is only suitable for correction of a single incorrect interrogation pattern, that is to say two directly successive "1" signals which are flanked with series of zeroes of mutually unequal length. The use of the invention enables less severe requirements to be imposed on the error-correcting properties of the code used than if the invention were not used. It is even possible to correct errors if the code itself does not have error-correcting properties (and hence no redundant data cells either). It is a special advantage of the invention that the updating device receives a running selection of the interrogation values, the length of the series of this selection being larger than the value which corresponds to the length of a data cell, in combination with the property that at least two interrogation points are situated between two signal transitions which succeed one another at the nominal minimum spacing. It will be clear that more complex error patterns can be corrected as the series length of the selection received by the updating device is greater.

Said exceed signal can be used in various ways, for example, for activating complex steps for error correction.

Preferably, said storage device is a shift register. A corrected series of interrogation values or a series of data values based thereon can thus be readily formed on the basis of a current selection of a non-corrected series of interrogation values. It will be found that the corrected series of interrogation values need not be physically formed, but that sometimes the data values are derived directly.

For use with a bivalent continuous signal with two permissible positions for a signal transition per bit cell, the interrogation generator is preferably adapted to form interrogation signals having a recurrent period which at the most equals 1/5 of the nominal length of a bit cell. For many binary codes having self-synchronizing properties, it is then possible, for example, to correct one interrogation value per bit cell.

Preferably, said exceed signal acts as an error signal and has a duration which corresponds to the length of a data cell. A non-corrected data cell is thus suitably indicated.

BRIEF DESCRIPTION OF THE FIGURES

The invention will be described with reference to the accompanying drawings, in which:

FIGS. 4a, 4b show tables of the relevant combinations of interrogation values with the resulting conditions in the updating device.

DESCRIPTION OF A PREFERRED EMBODIMENT

Figure 1:
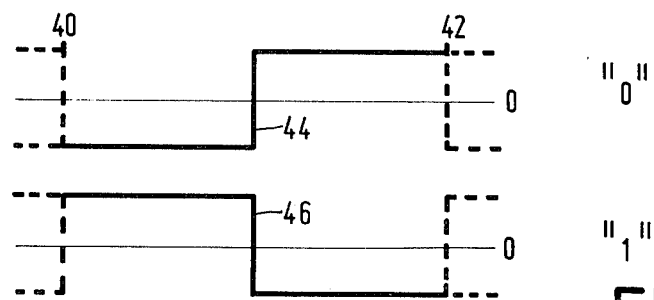
FIG. 1 shows the nominal waveforms of a biphase code.

FIG. 1 shows the nominal waveforms of a biphase code. The signal is bivalent. The bit cell is the time interval between the two indications 40 and 42. Signal transitions can occur at the boundary between two bit cells, i.e. if the bit cells contain the same data, either both a logic "0" or both a logic "1". If the two successive bit cells contain different data, the signal transition does not occur. Furthermore, a signal transition also occurs in the center of each data bit cell. The waveform 44, for example, indicates a logic "0" and the waveform 46 a logic "1". This is the so-called inverted biphase code which will be used hereinafter. The bit cells all have nominally the same length. The interval between two successive signal transitions nominally amounts to at least one-half bit cell and nominally at the most one whole bit cell.

Figure 2:
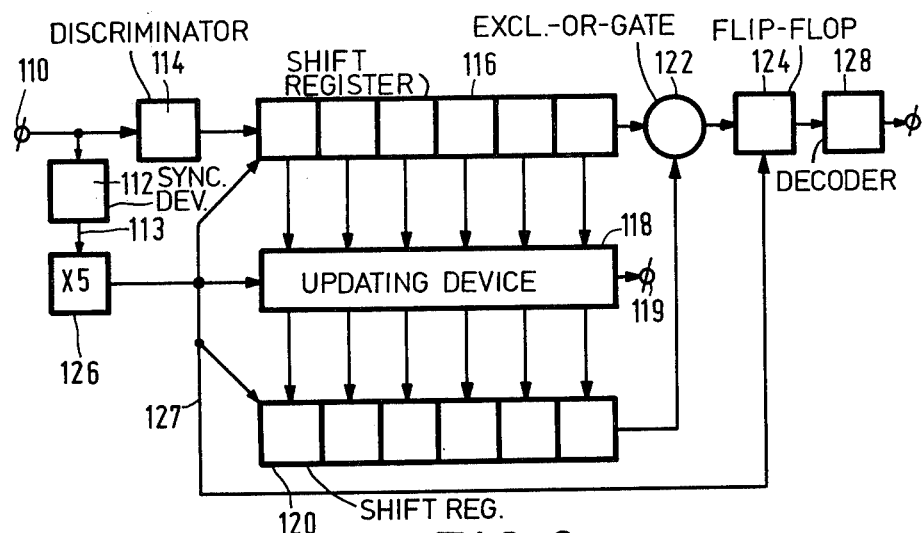
FIG. 2 is a block diagram of a device in accordance with the invention.

FIG. 2 is a block diagram of a device in accordance with the invention. The input signal arrives on the input 110, for example as a continuous signal according to the nominal waveforms shown in FIG. 1. In practice, various deviations may occur. For example, the edges of the signal transitions usually have a finite steepness. If the input signal is interrogated on just such an edge, either a logic "0" or a logic "1" may be produced for the value of the interrogation bit. A further complication consists in that the position of the discrimination level between the values "0" and "1" is liable to drift over time. Furthermore, the bit cell frequency may be subject to changes which are not instantaneously detected, and also external disturbances may occur. Element 112 is a synchronization device for forming a clock pulse series. The synchronization device 112 may be formed by means of an oscillator which is triggered by the signal transitions in the centers of the bit cells. The other signal transitions remain inactive, for example because each signal transition received sets a monostable multivibrator to the active state. The duration of the active state is slightly longer than the time corresponding to one-half bit cell, the next signal transition thus being blocked if it arrives within the next one-half bit cell. The transitions at the boundaries of the bit cells thus remain blocked. The invention does not concern such a synchronization device per se. A series of clock pulses having a recurrence period which equals the length of the bit cells then appears on line 113. Element 126 is a frequency multiplier. This element supplies interrogation pulses having a frequency which is five times higher than that of the pulses on line 113, to line 127. Line 127 is connected to the shift pulse input of shift registers 116 and 120. Under the control of a shift pulse, the shift register 116 stores the data from input 110 which are binarized by discriminator 114. Element 118 is an updating device. If necessary, this device is also synchronized by the signals on the line 127 in the manner indicated. The updating device 118 then, each time, detects the pattern of interrogation values stored in the shift register 116. If this pattern is one of a set of correct patterns, nothing happens other than the correspondence to this pattern is indicated. If the pattern is a non-correct pattern, but a correct pattern can be formed by modification of one interrogation value thereof (by inversion in this case), a "1" is stored in the shift register 120. This takes place at the bit position corresponding to the interrogation value to be inverted. The shift register 120 also receives the pulses on the line 127. Element 122 is an exclusive-OR-gate; if the shift register 120 supplies a "1", the output bit of the shift register 116 is inverted and stored in a data flipflop 124 under the control of a pulse on the line 127. Element 128 is a known decoder for the biphase code. The output bits appear on output 130. The updating device 118 also comprises an additional output 119. In the cases described (correct pattern or correctable pattern), a logic "0" appears on this output. If the pattern could only be corrected by the modification of two interrogation values, a logic "1" appears on this output: this is the "exceed signal". In the case of the biphase code described, it is usually impossible to provide an unambiguous correction when two errors and six interrogation values are present, and this "exceed signal" then acts as an error signal. When redundant data bits are also present, still further errors can be corrected, certainly if given data bits are indicated as being ambiguous by the error signal. In the FIGS. 4a, 4b this may concern all cases where an interrogation bit was corrected.

A description will now be given of the execution of a correction of the code shown in FIG. 1 by means of the device in accordance with the invention. FIG. 1 shows that the nominally longest period of time between two directly successive transitions equals the length of one bit cell. It is also assumed that the interrogation is realized at a frequency which amounts to five times the bit cell frequency. The properties of the code and those of the interrogation frequency are such that the following conditions must be satisfied:

a. at the most, five interrogation points can be situated within one bit cell;

b. if three interrogation points are situated in one half of a bit cell, the other half of the bit cell contains at the most two interrogation points;

c. each half of a bit cell always contains at least two interrogation points;

d. a high level in one half of a bit cell always leads to a low level in the other half of the bit cell and vice versa.

Assume that the shift register 116 contains the following six interrogation values;

001101

(the last "1" is the most recent value). This series of interrogation values cannot be in agreement with the above condition c; furthermore, for one of the interrogation values it is assumed to be known that it is situated in a given half of a bit cell; in this case, the fourth bit from the left is situated in the first half of a bit cell. In the following description of an embodiment, it will be described how each interrogation value in particular is processed in combination with the three preceding interrogation values and the two subsequent interrogation values. These six interrogation values are stored in the shift register 116. In the example described, the sequence 1-0-1 is impermissible. A modification can in principle be realized in order to form one of the following combinations, it being assumed that the case involving one incorrect interrogation bit is more likely to occur than the case involving two or more incorrect interrogation bits. Moreover, the correction would be ambiguous if several interrogation bits could be incorrect.

1. 001001; in this case the 010 sequence is incompatible with condition c.

2. 001111: in this case the sequence 1-1-1-1 is incompatible with condition d, because it would mean that four high interrogation values originate from one bit cell.

3. 001100: this is a permissible combination. By filling the extreme right-hand bit position of the shift register 120 with a simulation signal ("1"), the error can be corrected at a later stage. The error, of course, can alternatively be corrected directly in the shift register 116.

Uncorrectable errors can also occur. For example, the pattern of interrogation values 010101 is always uncorrectable. Furthermore, it is also possible that an impermissible pattern can be corrected in two different ways, as will appear hereinafter.

Figure 3:
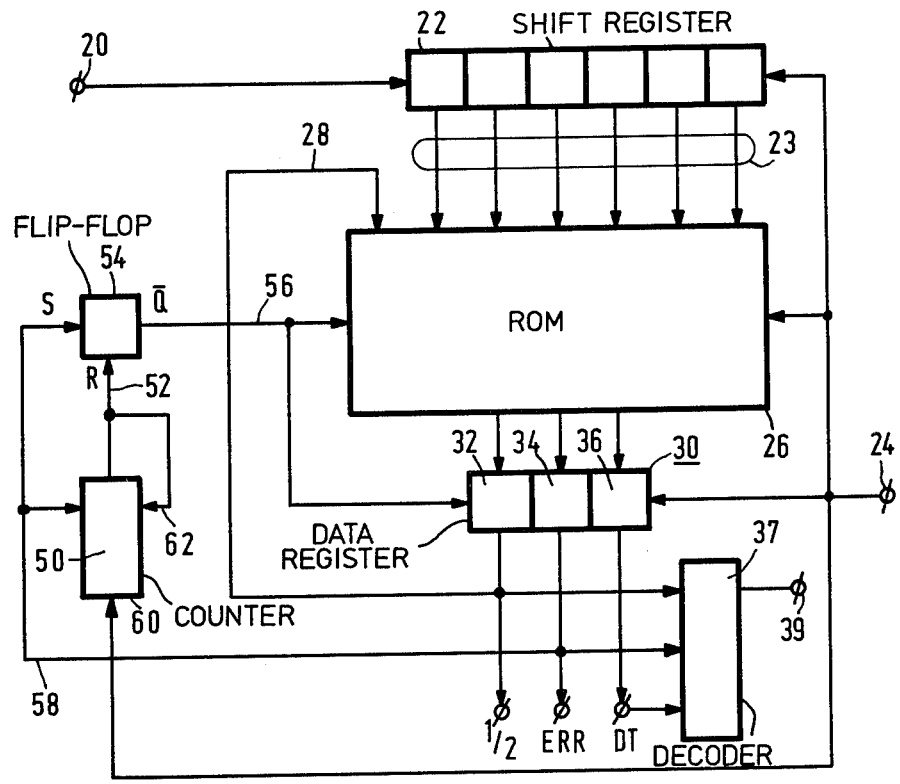
FIG. 3 shows a correction device for use with a biphase code.

In this respect, FIG. 3 shows a second embodiment of a correction device for a biphase code. The input data arrives on terminal 20. A clock pulse series is received on terminal 24 with a frequency which amounts to fixe times the bit cell frequency. A shift register 22 corresponds to the elements 114 and 116 in FIG. 2. The element 26 is an updating device which is constructed as a read-only memory. The read-only memory 26 contains $2^7 = 128$ address locations, six address bits being received from the shift register 22 via lines 23. The address locations of the memory 26 contain three bit words. Under the control of each element of the clock pulse series on the input 24, the word then addressed in the memory 26 is read and the data thereof is stored in the data register 30 which comprises bit locations 32, 34, 36. The bit location 36 provides the decoded value of the data bit. This value has to be made externally known only once per five interrogation bits; in this embodiment at the beginning of the second half of the bit cell. In the present embodiment a dummy data bit, for example, always "0", may be stored in this bit position in the case of interrogation positions other than at the beginning of such a second half. The bit position 34 contains a signal value "1" when an uncorrectable error has been detected and the data in the bit position 36, therefore, is not relevant for the environment for the time being. The bit position 34 contains a signal value "0" when no such uncorrectable error has been detected. In such a case it may again be that the position 36 contains incorrect data, but that this has not been signalled: an error is detected only from an incorrect sequence of interrogation bits, and the disturbed sequence may itself be permissible. The bit position 32 contains information as to whether the relevant interrogation bit (the interrogation bit present in the fourth position from the right of the shift register 22) is situated in the first half or in the second half of a bit cell. When the bit position 32 contains a logic "0", the first half is concerned; when the bit position 32 contains a logic "1", the second half is concerned. For a user decoder 37 having a data output 39, a positive-going edge on the output of stage 32 indicates that the new data bit is available on the output of the stage 36 (unless an error has occurred, which is controlled by the stage 34). It has been found that the read-only memory 26 can be programmed to consider each interrogation bit in combination with neighboring bits and to correct this bit and to decode this bit, or to signal an uncorrectable error. The bit position 32 supplies an additional address bit for the memory 26 via line 28, so that the first and the second half of a bit cell are treated in a mutually different manner. Furthermore, the circuit comprises a set/reset flipflop (RS-flipflop) 54. When the signal from the bit position 34 indicates an error, flipflop 54 is set to the "1" state by the positive-going edge of the signal on line 58. Consequently, the signal on line 56 becomes "0" and acts as a blocking signal ($\overline{\text{ENABLE}}$) for the read-only memory 26 and the register 30. As a result, no further data appears on the outputs of the register 30. The signal on the line 58 also acts as a (pulse-shaped) enable signal for the counter 50 which can thus start counting the clock pulses on its counting input 60. When the counter 50 has counted five clock pulses, an output carry signal appears on line 52; this signal is applied to the blocking input 62 of counter 50, so that the counter 50 is blocked against further counting. Moreover, the flipflop 54 is reset to the "0" state. Consequently, the read-only memory 26 and the register 30 are no longer blocked, and a series of further read operations can be performed. The processing of the data from the three bit positions 32, 34, 36 in a user device can be realized in a suitable manner. For example, the user decoder 37 may comprise a shift register having a width of two bits. Under the control of each clock pulse (supplied by stage 32), the data bit from stage 36 is written therein in synchronism. The error bit from the bit position 34 is written directly because the first stage of the shift register comprises a differentiating input for this purpose: when the bit position 34 indicates an error, it is automatically taken over, regardless of when it occurs with respect to the data cell. This error bit then acts as flag information in order to mark a data bit as being ambiguous. For example, the correction in the case of an error correcting code is thus simplified. Such a correction, however, can also be realized by means of known procedures, and will not be elaborated upon herein.

Figure 4A:
Figure 4B:
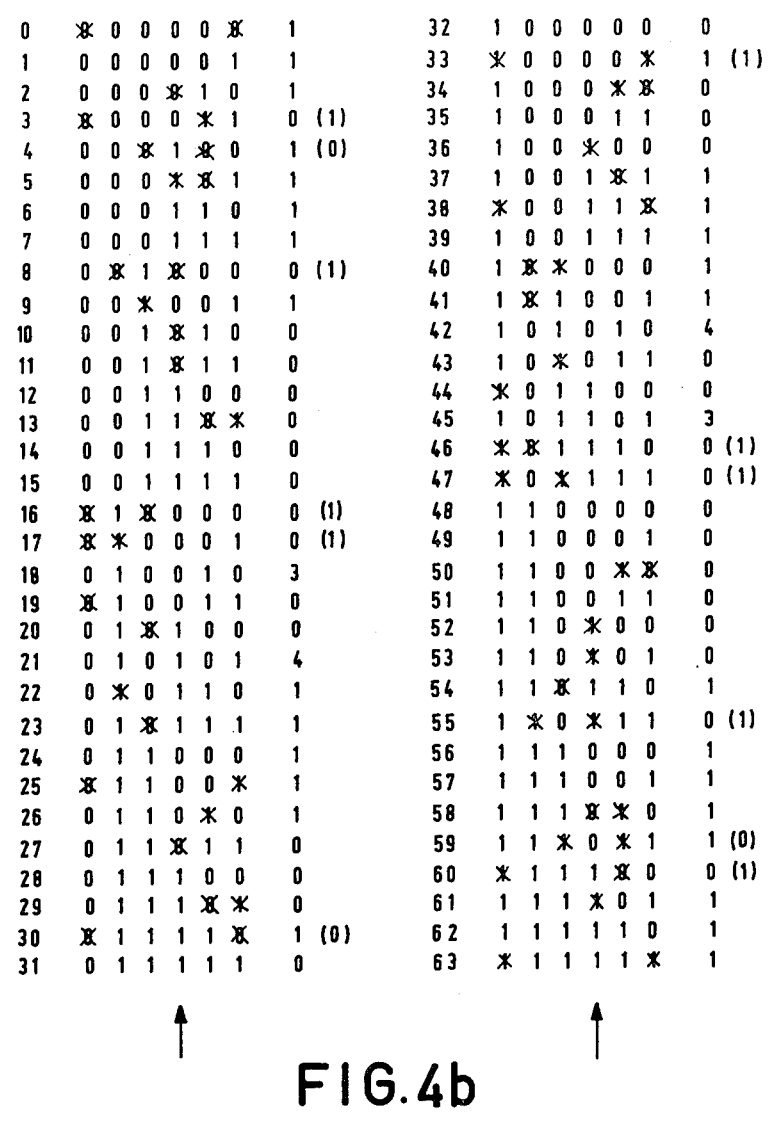

FIGS. 4a, 4b in this respect illustrate the operation of the updating device of FIG. 3; they show the ultimate reaction for each feasible bit pattern. The first column of FIG. 4a contains the decimal value of a bit pattern shown in the second column. The extreme left-hand bit is the first bit received, and the extreme right-hand bit is the last bit received. Only six bits are considered (as a running selection from the data stream received). FIG. 4a notably relates to the cases where the third bit from the left is situated in the first half of a bit cell. Similarly, FIG. 4b concerns the cases where the third bit from the left is situated in the second half of a bit cell. The serial data stream is interrogated five times at equally spaced instants per nominal bit cell period, the signal transition being situated exactly in the center of a bit cell according to the biphase code (FIG. 1). The interrogation pattern "00011" for a data bit "0" is thus exactly equally likely to occur as the interrogation pattern "00111".

The third column contains the result code from the updating device 26; the digits of this code have the following meaning in FIG. 4a;

0: the relevant interrogation bit, the fourth bit from the left is still situated in the first half of the bit cell.

1: the relevant interrogation bit is the first one of the second half of the bit cell, and the data content of the bit cell is a "0" (transition to interrogation signal "1").

2: the relevant interrogation bit is the first one of the second half of the bit cell and the datacontent of the bit cell is a "1" (transition to interrogation signal "0").

3: the relevant interrogation bit is still present in the first half of the bit cell and an uncorrectable error has occurred.

4: the relevant interrogation bit is the first one of the second half of the bit cell, but an uncorrectable error has occurred, so that the data content of the bit cell cannot be determined. If a one bit correction would be required, this bit position is provided with a cross. In given cases, an error can be corrected in two ways by modification of only one interrogation bit.

The digits in FIG. 4b have the following meaning;

0: the relevant interrogation bit is still present in the second half of the bit cell.

1: the relevant interrogation bit is the first bit of the next bit cell whose value, of course, is not yet specified, because this takes place only upon the transition from the first half to the second half.

3: the relevant interrogation bit is still present in the second half of the relevant bit cell, but an uncorrectable error has occurred.

4: the relevant interrogation bit is the first one of the next bit cell, but an uncorrectable error has occurred.

Evidently, the result code "2" does not occur in FIG. 4b. There are a number of categories of cases. First of all, there are the correct cases. These cases are formed by interrogation patterns which comprise the same numbers of interrogation bits in the first and the second half of the bit cell. When a sequence of bit cells which all produce the patterns (11100), the cases a14 (FIG. 4a, case 14) a28, a57, b51, b39 are found therefrom. Such sequences are also found for combinations of the patterns (11100) and (00011) and on the other hand also for combinations of the patterns (11000) and (00111).

Secondly, there are patterns which become correct by correction of an interrogation bit (the corrected bit is crossed). Thus, pattern a2 becomes the correct pattern a3, a10 becomes a14, a26 becomes a24, b61 becomes b57, etc.

Some patterns can be corrected by two different corrections. For example, the pattern b5 is corrected to obtain the correct patterns b1 or b7. The same is applicable to the patterns a17, a19, a25, a30, a33, a38, a44, a46, b13, b25, b29, b34, b38, b40, b50, b58. In the set-up shown in FIG. 3, this has no consequences because always the same code is assigned to the relevant results. There are also correct patterns which change over into another correct pattern under the influence of such a correction. Such a correction is not taken into account, because the assumption "no error" is more likely correct than the assumption "one error".

There are also a number of cases which can, in principle, be converted into a correct pattern in two ways. In that case the resulting code is determined by the preceding pattern. For example, pattern a8 can be reached from b4. This means that the result code (0) is most probable: the code (2) is given between brackets, because otherwise two transitions between bit cell halves would be situated at directly successive interrogation positions. The same is applicable to the cases a15, a48, a55, b8, b16, b17, b46, b47, b55. Pattern b3 is irrelevant, because it cannot be reached (a1 and a33 have the result code 0, b1 and b33 both have the result code 1). Also selected are:

b60: the result code 0, because the (next) patterns resulting therefrom (b56, b57) both offer the result code 1 anyway.

b59 and b4: both result code 1 as a counterpart to the cases a4, a59.

Finally, the patterns b0 and b63 can be converted into a correct pattern in two ways. The pattern 100000 can become the correct pattern b32 (result code 0). However, in agreement with the correct pattern b1, the result code "1" is chosen, because otherwise a continuous result code "0" could result. For the case b32, the result code b0 is chosen, because the patterns stemming therefrom produce the result code "1" anyway. For the patterns b30, b33 the result code "1" is chosen.

The error correction described can similarly be used for other codes, for example, the Miller code which comprises fewer signal transitions. If more interrogation bits are considered together, a larger error correction capacity is also realized. For example, two incorrect interrogation bits can then be corrected or ignored, like in the embodiment described. The length of the pattern of the interrogation bits considered together may also extend further beyond a data cell or bit cell.

Figure 5:
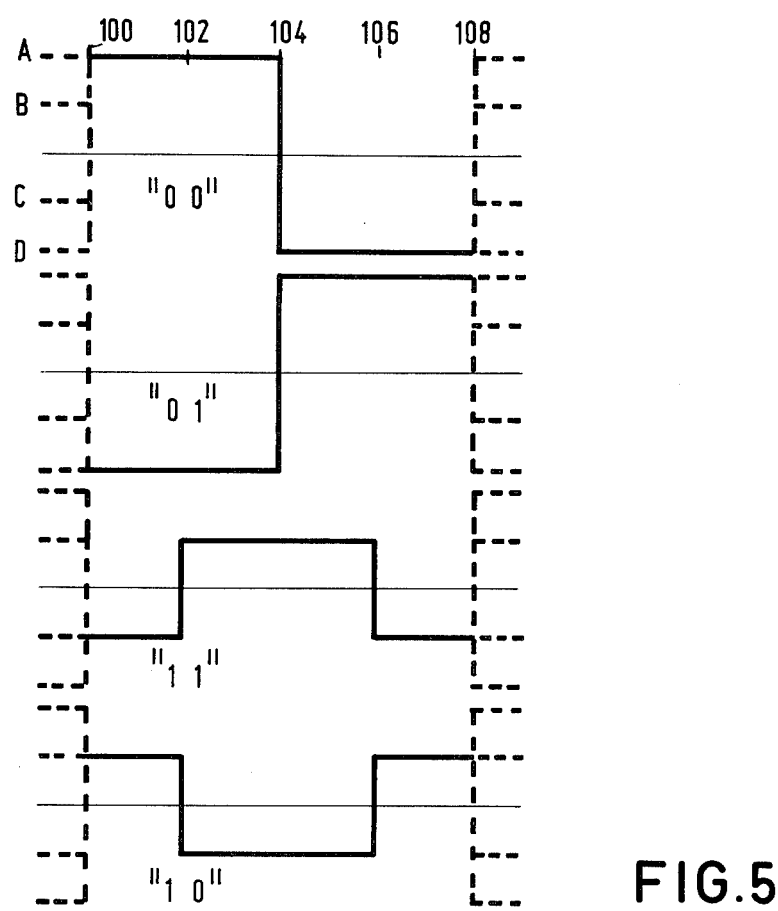
FIG. 5 shows the nominal waveforms of a code with four signal levels, which code can be advantageously used in a device in accordance with the invention.

FIG. 5 shows the nominal waveforms of a code with four signal levels A, B, C, D, respectively. Each data cell contains two data bits. Each different data content of a data cell represents a different waveform. The length of a data cell is the time interval between the indications 100 and 108, which is divided into three nominally equal parts by the indications 102, 104, 106. Within a data cell the transitions can occur at three positions: at position 102 from level B to level C and vice versa; at position 104 from level A to level D and vice versa; at position 106 from level B to level C and vice versa.

Furthermore, all feasible transitions can occur at the boundaries of the bit cells. The sixteen possibilities are indicated by interrupted lines at the indications 100 and 108. The data contents of the data cells are indicated each time. This code is interrogated at a frequency which amounts to at least eight times the data cell frequency. In order to generate a simulation signal, nine interrogation signals are then taken into account. If the series of interrogation signals corresponds to a sequence of two of the signals shown in FIG. 5 and the fifth interrogation signal is the first one of the second half of a data cell, a simulation signal is formed for one of the four data values 00, 01, 10, 11. If said fifth interrogation signal is not (yet) the first one of the second half of a data cell, a signal "wait" is formed. These simulation or wait signals are also formed when a correct pattern can be formed by a limited modification of the interrogation signals. Such a permissible modification may concern, for example, an arbitrary change of one interrogation signal or a limited change (for example, interchanging the pairs of signal levels A/B, C/D) of two interrogation values. In other cases an error signal is generated which remains valid for eight interrogation instants. The invention can similarly be used for other codes.

What is claimed is:

1. A device for interrogating and correcting a serial data signal which consists of a non-interrupted series of data cells and therein a continuous signal having a finite number of discrete nominal signal values and transitions between said signal values, said transitions mutually having a nominal minimum spacing and a nominal maximum spacing, characterized in that the device comprises:
   a. a synchronization device for deriving and updating an actual synchronization period from said transitions;
   b. an interrogation generator for forming, under the control of a signal sequence having said synchronization period, a series of substantially equally spaced interrogation signals having a nominal recurrence period which amounts to, at the most, half the value of said minimum spacing;
   c. a storage device for receiving and storing, under the control of said series of interrogation signals, a succession of interrogation values each discriminated to one of said finite number of nominal signal values;
   d. an updated device which is connected to said storage device for receiving, each time in synchronism with an interrogation signal, a current selection of, each time, at least five successive interrogation values of said succession, said successive interrogation values comprising at least one interrogation value beyond the number which corresponds to the length of a data cell, for generating, under the control of one of a first predetermined number greater than 1 of permissible combinations of said successive interrogation values, a correspondence signal for the relevant combination, for generating, under the control of one of a second predetermined number greater than 1 of impermissible combinations of said successive interrogation values, a simulation signal for simulating, each time for an impermissible combination, a corresponding permissible combination which differs therefrom by one interrogation value and which is part of a third predetermined number greater than 1 of permissible combinations of successive interrogation values, and for generating an exceed signal under the control of further impermissible combinations of said successive interrogation values;
   e. a decoder for receiving said corresponding or simulated interrogation values and for reconstructing a series of digital data therefrom; and
   f. a final output which is connected to the decoder for supplying a decoded series of data to a user device.

2. A device as claimed in claim 1, characterized in that said storage device is a shift register.

3. A device as claimed in claim 1, characterized in that, for use with a bivalent continuous signal with two permissible positions for a signal transition per bit cell, the interrogation generator is adapted to form interrogation signals having a recurrence period which at the most equals 1/5 of the nominal length of a bit cell.

4. A device as claimed in claim 1, characterized in that said exceed signal acts as an error signal and has a duration which corresponds to the length of a data cell.

* * * * *